Figure 7:
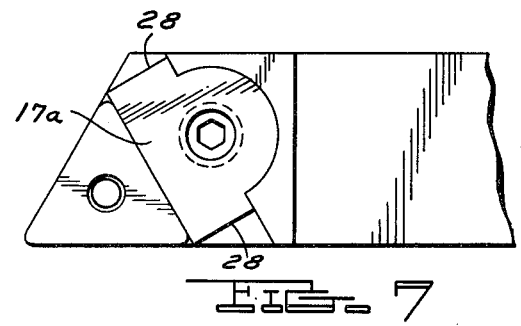

April 6, 1965 V. MILEWSKI 3,176,377
PRESSED PIN CUTTING TOOL HOLDER
Filed Feb. 26, 1964
2 Sheets-Sheet 1
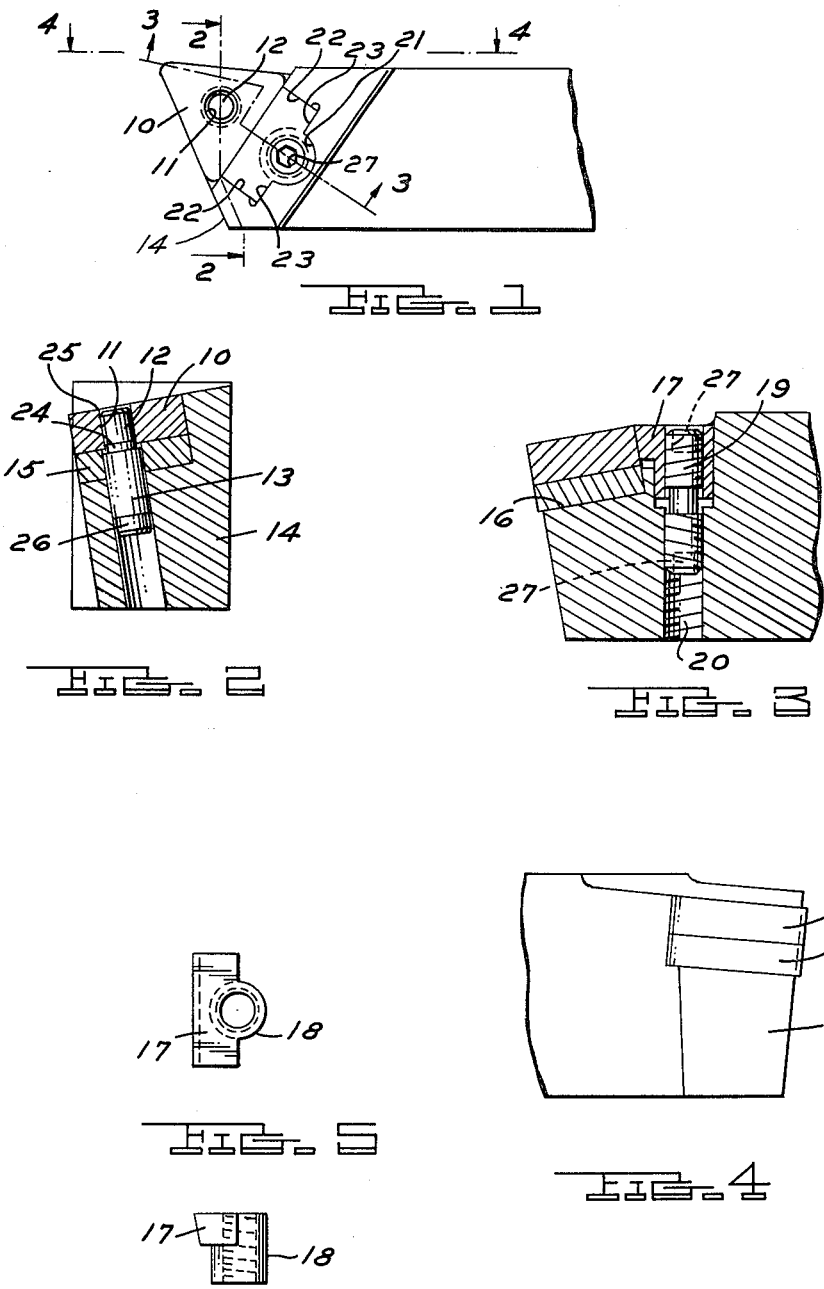
INVENTOR.
VICTOR MILEWSKI
BY Farley, Forster
& Farley
ATTORNEYS April 6, 1965 V. MILEWSKI 3,176,377
PRESSED PIN CUTTING TOOL HOLDER
Filed Feb. 26, 1964 2 Sheets-Sheet 2

INVENTOR.
VICTOR MILEWSKI
BY Farley, Forster
& Farley
ATTORNEYS

United States Patent Office 3,176,377
Patented Apr. 6, 1965

3,176,377
PRESSED PIN CUTTING TOOL HOLDER
Victor Milewski, Birmingham, Mich., assignor to The Valeron Corporation, Detroit, Mich., a corporation of Michigan
Filed Feb. 26, 1964, Ser. No. 347,448
3 Claims. (Cl. 29—96)

This invention relates to an improved construction for holding cutting inserts and more particularly to a construction particularly adapted for holding indexable throw-away cutting inserts made of tungsten carbide or other suitable materials.

In a typical application of the invention the cutting insert is a relatively thin indexable element having polygonal side faces normal to a main seating face and a central cylindrical hole extending through the insert which is adapted to fit closely over a cylindrical pin pressed into the tool holder. A wedging element is adapted to engage one or more of the side surfaces of the insert forcing it laterally against the obstruction pin to lock the cutting element in operating position.

With this construction no top clamping element is required and any obstructions to the free flow of chips formed by the cutting operation are eliminated. The wedge employed in forcing the cutting element laterally against the obstruction pin is actuated downwardly producing a frictional drag on the insert toward the seating face and the obstruction pin together with the wedge lock positively orient and confine the cutting element against any possible lateral shifting from cutting operation pressures.

Figure 8:
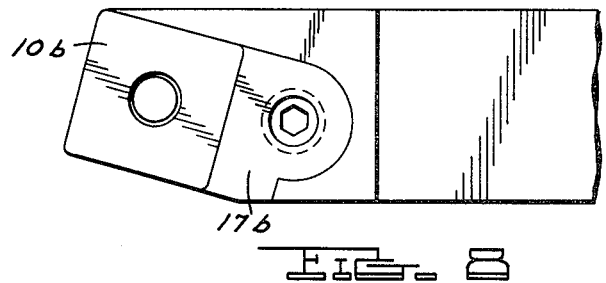
Figure 9:
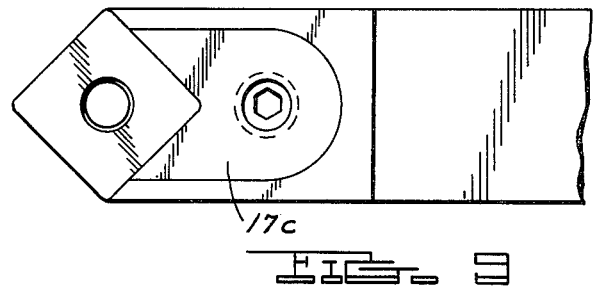
Figure 10:
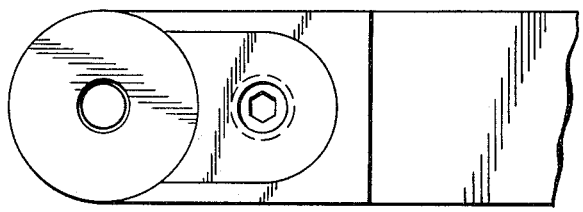

These and other objects and advantages will be more apparent from the following description of a preferred embodiment and several modifications of the invention as illustrated in the drawings wherein:

FIG. 1 is a plan view of a typical turning tool assembly;
FIG. 2 is a sectional view taken along the line 2—2 of FIG. 1;
FIG. 3 is a sectional view taken along the line 3—3 of FIG. 1;
FIG. 4 is a side elevation taken along the line 4—4 of FIG. 1;
FIG. 5 is a plan view of the wedge element per se employed to lock the cutting element in position;
FIG. 6 is an end elevation of such wedge element;
FIG. 7 is a plan view similar to FIG. 1 showing a somewhat modified wedging element;
FIG. 8 is a plan view of a further modification showing an adaptation of the invention to a square cutting element;
FIG. 9 is a further modification showing adaptation of the wedging element to the engagement of plural faces of the cutting insert; and
FIG. 10 is a further modification illustrating the application of the invention to a circular cutting insert.

Referring to the first embodiment illustrated in FIGS. 1–6 the cutting element in this case a triangular tungsten carbide insert 10 having a central cylindrical hole 11 engaging the cylindrical head 12 of an obstruction pin 13 pressed into the body 14 of the holder, which in this case is a turning tool. A shim seat 15 is interposed between the cutting insert 10 and a flat seat 16 formed in the body normal to the axis of the obstruction pin 13 and hole 11 in the cutting insert. A wedging element 17 is provided with an enlarged cylindrical protrusion 18 having a threaded hole for engagement by a differential locking screw 19 which also engages a threaded hole 20 provided in the cutter body. A wedge slot is provided in the body 14 which includes a semi-cylindrical recess 21 and extends between a pair of end walls 22 retained to provide maximum strength and rigidity in the holder as well as a substantially flush surface across the entire top face of the tool assembly.

The cylindrical protrusion 18 is provided and dimensioned relative to the semi-cylindrical recess 21 and adjacent walls 23 to provide clearance or bare contact without substantial pressure between the walls 23 and adjacent end surfaces of the wedge element in order to assure transmission of direct central pressure on the cutting insert 10 in line with the obstruction pin rather than a concentration of wedge pressure near the cutting points of the triangular insert which could place the minimum section of the cutting insert under tension tending to crack same.

The diameter of the pin head 12 is proportioned relative to the adjacent wall thickness of the cutting insert 10 to provide an appropriate balance of pin shear strength and cutting insert wall strength. A somewhat larger pin diameter is employed below the head to maximize rigidity against bending stresses. A slight undercut 24 is provided in the pin immediately below the head 12 to relieve pressures at the edge of the hole in the carbide which might otherwise tend to chip the same and a slight bevel 25 is provided at the top of the pin head for the same purpose. A slight reduction in the diameter of the pin at the lower end 26 is provided to serve as a starting guide in pressing the pin into the body.

The differential screw 19 for actuating the wedge lock is provided with socket head recesses 27 at both ends in order to accommodate actuation from either side of the tool.

In the modification of FIG. 7 the walls 22 of the FIG. 1 embodiment are eliminated simplifying the machining of the wedge slot and the ends 28 of the modified wedge element 17a are extended slightly beyond the engaged surface of the cutting insert.

In FIG. 8 a further modification is shown in the wedge 17b to accommodate clamping of a square cutting insert 10b and in FIG. 9 the wedge 17c is adapted to engage two faces of a square cutting insert accommodating a central location for the cutting point. In FIG. 10 a further modification in the wedge 17b is adapted to accommodate a circular cutting insert 10d.

From the foregoing description and illustrations it will be apparent that the top face of the cutting insert and holder are completely free of any obstructions that could interfere with flow of chips formed by the cutting operation.

The obstruction pin in each case becomes an integral part of the holding device after it is pressed into the body providing maximum strength and rigidity in contact bearing area with the cutting insert. Since the pin is not subject to any rotating frictional wear it can be heat treated to the most ideal physical properties for maximum shear strength.

While a preferred embodiment and several modifications have shown the application of the invention to turning tools it will be understood that numerous other modifications and applications to other types of tools including rotating cutters and boring bars may be employed without departing from the scope of the invention as defined in the following claims.

I claim:
1. A cutting tool comprising a body having a seat extending in a flat plane, a cutting insert located on said seat comprising an indexable regular polygon having edge surfaces normal to said seat, a cylindrical pin in said body projecting from said seat having an axis normal thereto, a cylindrical hole in said insert centrally located relative to the edge surfaces thereof extending normal to said seat fitting closely over said pin, means for producing relative lateral movement between said pin and said insert substantially confined to a plane containing the axis of said pin and the center of resulting pressure contact between said pin and cutting insert, said body having a recess formed therein for engaging said means, said recess including an arcuate seat adapted to provide back-up reaction pressure concentrated substantially along said latter plane.

2. A cutting tool as set forth in claim 1 including a screw hole extending through said body in a direction substantially parallel to the axis of said arcuate seat.

3. A cutting tool comprising a body having a seat, a cutting insert located on said seat, a cylindrical pin in said body projecting from said seat, a hole in said insert fitting over said pin, and means for producing relative lateral movement between said pin and said insert, said relative lateral movement being substantially confined to a plane containing the axis of said pin and the center of resulting pressure contact between said pin and cutting insert, said pin being pressed into said body with an interference fit, and said means for producing relative lateral movement comprising a wedge element, a back-up surface on said body adapted to engage one wedge surface and an opposed wedge surface being adapted to engage at least one edge surface of said cutting insert, said body back-up and adjacent wedge surfaces being arcuate in form to provide back-up reaction pressure concentrated substantially along said plane.

References Cited by the Examiner
UNITED STATES PATENTS

| | | | |
|---|---|---|---|
| 2,181,023 | 11/39 | Moore | 29—96 |
| 2,644,224 | 7/53 | Chilcott | 29—96 |
| 2,645,844 | 7/53 | Longe | 29—96 |
| 2,982,008 | 5/61 | Facknitz | 29—96 |
| 3,084,416 | 4/63 | Broughton | 29—96 |

OTHER REFERENCES

"Russian Carbides Compare With Western Products," an article from Metalworking Production Magazine of August 2, 1961, pages 11 and 12.

WILLIAM W. DYER, Jr., *Primary Examiner.*